United States Patent Office.

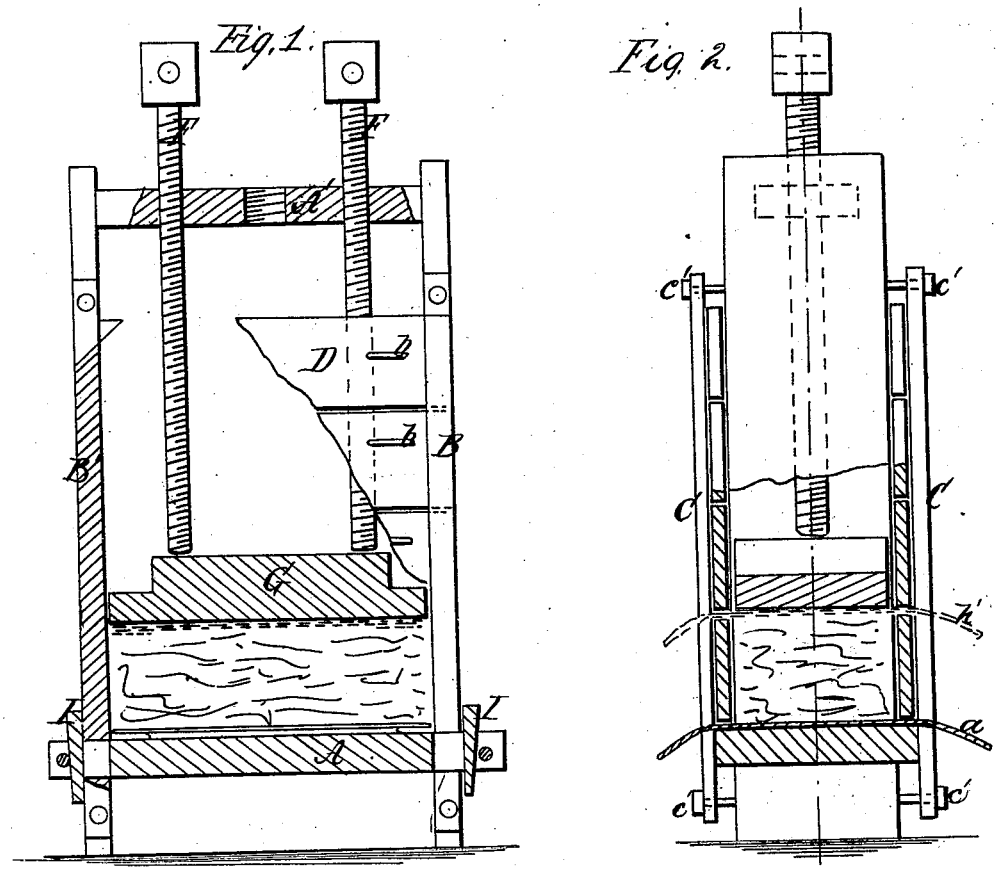

HENRY TAYLOR, OF MIDDLETOWN, WISCONSIN.

Letters Patent No. 79,413, dated June 30, 1868.

IMPROVED HOP-PRESS.

The Schedule referred to in these Letters Patent and making part of the same.

TO ALL WHOM IT MAY CONCERN:

Be it known that I, HENRY TAYLOR, of Middletown, in the county of Dane, and State of Wisconsin, have invented a new and useful Improvement in Hop-Presses; and I do hereby declare that the following is a full, clear, and exact description thereof, which will enable others skilled in the art to make and use the same, reference being had to the accompanying drawings, forming part of this specification.

The nature of my invention relates to improvements in hop-presses, whereby it is designed to provide a cheaper and more simple press than any now in use.

It consists of a stout frame, composed of two vertical posts and two horizontal beams, which compose the sides, top, and bottom walls of the same, the posts being jointed to the bed-plate or beam in a manner to allow them to be spread out after the bale has been formed, to facilitate the removal of the same, and provided with removable side planks, a follower, and operating-screws, as will be more fully described on reference to the accompanying drawings, wherein—

Figure 1 represents a side view, with a part broken away, and

Figure 2 an end view, also with a part broken away.

Similar letters of reference indicate corresponding parts.

A represents the bed-plate, A' the upper cross-beam, and B B' the posts. The beam A' is firmly jointed to the parts by mortise and tenons. The lower plate A is provided with long tenons at one or both ends, which pass through the posts, and is keyed up tightly to them, as shown in fig. 1. The posts are provided with vertical side rails, suspended from them at suitable distances by bolts $c'$, to provide a long slot or space to confine the ends of the side planking D of the press in a manner to admit of their being taken out or put in as desired. The upper plate, A', is provided with one or more screwed holes for the screws F. G represents a follower. The lower cross-beam, A, is made wider than the posts, to provide a support for the side planking.

To operate my improved press, a piece of canvas, $a$, is placed on the bed-plate, of the length of the bale, and wide enough to cover half the space of the sides, and be sewed to another corresponding piece, $b$.

The follower is then taken out of the press, filled with hops to the tops of the side planking; the aforesaid piece of cloth, $b$, is then placed over the top of the hops and the side planks, the follower put on under the screws, and the latter screwed down sufficiently to press the hops together, and the side planks, which are provided with handles $b$ for the purpose, taken out. The keys I I are then knocked loose, to allow the posts to spring away from close contact with the ends of the bale.

The pieces of canvas are now lapped together, and sewed or otherwise fastened, when the screws are raised, and the bale rolled out, and pieces sewed on the ends, completing it. The screws may be used either end up, and one or more may be used, as found best.

A press constructed after this plan is very cheaply made, and I have found them to give very satisfactory results in practice.

I am aware that the devices herein described, taken separately, are of themselves not new, but

What I claim, and desire to secure by Letters Patent, is—

The press, consisting of the posts B B', bed-plate A, upper cross-beam A', screws F, follower G, keys I, side rails C, and side planking $b$, all constructed and arranged to operate substantially as herein shown and described, for the purpose specified.

HENRY TAYLOR.

Witnesses:
JOHN McINTOSH,
W. HENDERSON.